United States Patent
Eriksson

(10) Patent No.: US 12,030,493 B2
(45) Date of Patent: Jul. 9, 2024

(54) CRUISE CONTROL SYSTEM AND A METHOD FOR CONTROLLING A POWERTRAIN

(71) Applicant: Volvo Truck Corporation, Gothenburg (SE)

(72) Inventor: Anders Eriksson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 11 days.

(21) Appl. No.: 17/793,073

(22) PCT Filed: Jan. 17, 2020

(86) PCT No.: PCT/EP2020/051079
§ 371 (c)(1),
(2) Date: Jul. 15, 2022

(87) PCT Pub. No.: WO2021/144029
PCT Pub. Date: Jul. 22, 2021

(65) Prior Publication Data
US 2023/0041291 A1    Feb. 9, 2023

(51) Int. Cl.
*B60W 30/14* (2006.01)
*B60W 30/18* (2012.01)
*B60W 30/182* (2020.01)

(52) U.S. Cl.
CPC .... *B60W 30/146* (2013.01); *B60W 30/18172* (2013.01); *B60W 30/182* (2013.01);
(Continued)

(58) Field of Classification Search
None
See application file for complete search history.

(56) References Cited

U.S. PATENT DOCUMENTS 11,131,553 B1 * 9/2021 Lyle .................. B60W 40/068
2006/0229792 A1   10/2006 Kawazoe et al.
(Continued)

FOREIGN PATENT DOCUMENTS

| EP | 1355209 A1 | 10/2003 |
| GB | 2445962 A | 7/2008 |
| WO | 2012158097 A1 | 11/2012 |

OTHER PUBLICATIONS

International Search Report and Written Opinion of the International Searching Authority, PCT/EP2020/051079, mailed Oct. 28, 2020, 14 pages.

*Primary Examiner* — Amelia Vorce
(74) *Attorney, Agent, or Firm* — Sage Patent Group

(57) ABSTRACT

An automatic cruise control system for controlling at least a powertrain of a vehicle, the cruise control system being configured to automatically control a vehicle speed to a target speed determined based on a set speed and on information relating to a road topography along an expected travelling route of the vehicle. The automatic cruise control system is configured to:
while automatically controlling the vehicle speed to the target speed, receive an indication that a slippery road condition applies or is expected to apply,
in response to receiving said indication, activate a predefined slippery road condition driving mode in which predetermined restrictions apply, said restrictions relating to at least one of the vehicle speed, an allowable vehicle acceleration, and a gear selection of the powertrain,
control at least the powertrain in accordance with the slippery road condition driving mode.

15 Claims, 2 Drawing Sheets

(52) U.S. Cl.
CPC ... *B60W 2300/125* (2013.01); *B60W 2552/05* (2020.02); *B60W 2552/20* (2020.02); *B60W 2710/1005* (2013.01); *B60W 2720/10* (2013.01); *B60W 2720/106* (2013.01)

(56) References Cited

U.S. PATENT DOCUMENTS

| | | | |
|---|---|---|---|
| 2009/0037069 A1* | 2/2009 | Inoue | B60W 10/06 |
| | | | 701/93 |
| 2010/0020170 A1 | 1/2010 | Higgins-Luthman et al. | |
| 2013/0179045 A1* | 7/2013 | Maier | F16H 61/0213 |
| | | | 701/53 |
| 2017/0001639 A1* | 1/2017 | Dempsey | G08G 1/16 |
| 2017/0197619 A1* | 7/2017 | Kelly | B60W 10/04 |
| 2018/0043793 A1* | 2/2018 | Herb | B60W 10/08 |
| 2018/0141549 A1* | 5/2018 | Kelly | B60W 30/143 |
| 2019/0161082 A1* | 5/2019 | Fairgrieve | B60W 10/184 |
| 2019/0202470 A1* | 7/2019 | Glebov | B60W 40/09 |
| 2020/0189567 A1* | 6/2020 | Silver | B60W 30/02 |
| 2020/0290611 A1* | 9/2020 | Tang | B60W 30/143 |
| 2021/0070299 A1* | 3/2021 | Dempsey | B60W 50/0097 |
| 2021/0109545 A1* | 4/2021 | Lopez | G05D 1/0088 |
| 2021/0229697 A1* | 7/2021 | Lee | G05D 1/0011 |
| 2022/0009502 A1* | 1/2022 | Yokoyama | G06T 7/0004 |
| 2022/0048514 A1* | 2/2022 | Stenneth | B60W 30/18172 |

\* cited by examiner

CRUISE CONTROL SYSTEM AND A METHOD FOR CONTROLLING A POWERTRAIN

CROSS REFERENCE TO RELATED APPLICATIONS

This application is a 35 U.S.C. § 371 national stage application of PCT International Application No. PCT/EP2020/051079 filed on Jan. 17, 2020, the disclosure and content of which is incorporated by reference herein in its entirety.

TECHNICAL FIELD

The invention relates to an automatic cruise control system and a method for controlling at least a powertrain of a vehicle of a vehicle. The invention also relates to a vehicle, a computer program, and a computer readable medium.

The invention can be applied in heavy-duty vehicles, such as trucks, buses and construction equipment. Although the invention will be described with respect to a truck, the invention is not restricted to this particular vehicle, but may also be used in other vehicles such as light-weight trucks, articulated haulers, wheel loaders, and passenger cars.

BACKGROUND

Driver assistance systems including intelligent cruise controls are important tools for lowering fuel consumption and improving safety during driving of heavy-duty vehicles. An intelligent cruise control allows a driver of the vehicle to set a desired speed, usually referred to as a set speed of the cruise control, and controls the vehicle speed to a reference speed based on this set speed. The reference speed may be allowed to differ within certain limits from the set speed, based on e.g. road topography and traffic conditions. Map data in combination with positioning information may be used for this purpose, as well as sensors provided on the vehicle. On one hand, such cruise controls are able to adjust the actual vehicle speed to the topography of the road, thereby allowing the vehicle to build momentum ahead of a hill and to take advantage of kinetic energy gained during downhill travel such that the total fuel consumption may be reduced. On the other hand, when travelling behind another vehicle, such a cruise control is able to automatically adapt a distance or time gap to the vehicle ahead to a minimum safety gap, thereby improving driving safety. A local environment perception sensor, such as a camera, a radar or a lidar (Light Detection and Ranging), may for example be used for determining the inter-vehicle distance.

However, when the weather conditions are such that the road surface is slippery, the driver may consider it necessary to disable the cruise control of the vehicle in order to be able to safely operate the vehicle. As a result of disabling the cruise control, the total fuel consumption of the vehicle may increase.

Definitions

By an acceleration of a vehicle is to be understood an acceleration in a direction of travel of the vehicle, i.e. in a direction parallel with a road surface on which the vehicle is travelling.

SUMMARY

A primary object of the invention is to provide an automatic cruise control system and a method for controlling at least a powertrain of a vehicle, which cruise control system and method may be used for controlling at least the powertrain also in slippery road conditions. In particular, it is an object to provide such an automatic cruise control system and method which increase the probability that a driver of the vehicle will keep the automatic cruise control system of the vehicle activated when the road surface is slippery.

According to a first aspect of the invention, at least the primary object is achieved by an automatic cruise control system for controlling at least a powertrain of a vehicle according to claim 1. The cruise control system is configured to automatically control a vehicle speed to a target speed determined based on a set speed and on information relating to a road topography along an expected travelling route of the vehicle. The automatic cruise control system is configured to:
  while automatically controlling the vehicle speed to the target speed, receive an indication that a slippery road condition applies or is expected to apply,
  in response to receiving said indication, activate a predefined slippery road condition driving mode in which predetermined restrictions apply, said restrictions relating to at least one of the vehicle speed, an allowable vehicle acceleration, and a gear selection of the powertrain,
  control at least the powertrain in accordance with the slippery road condition driving mode.

By providing a predefined slippery road condition driving mode which is activated either upon a request from a user of the vehicle, such as a driver, or upon a detection of a slippery road surface, the likelihood that the user will continue to use the automatic cruise control also in weather conditions leading to a slippery road surface increases, since the predetermined restrictions ensure a safe operation of the vehicle. Increases in fuel consumption due to deactivation of the cruise control are thereby avoided. Furthermore, driving comfort is improved, since the powertrain may be automatically controlled also in slippery road conditions.

The automatic cruise control system according to the invention is a predictive cruise control system, in which the vehicle speed is controlled based both on the set speed, as set by a user/driver of the vehicle, and on the information relating to the road topography along an expected travelling route of the vehicle. The target speed to which the vehicle speed is controlled may be allowed to differ from the set speed within predefined limits. The target speed may sometimes also be referred to as a reference speed of the automatic cruise control.

The predetermined restrictions are herein to be understood as restrictions which are specifically associated with the slippery driving mode. The predetermined restrictions of the predefined slippery road condition driving mode thus differ from restrictions associated with other modes of the automatic cruise control. The predetermined restrictions of the predefined slippery road condition driving mode may be used to reduce the vehicle speed and the vehicle acceleration and to restrict the amount of gear shifts. For example, the predetermined restrictions may be set so as to disable speed-increasing functions of the automatic cruise control system, which speed-increasing functions are during normal conditions performed to gain momentum and thereby save fuel.

The automatic cruise control system may also be configured for controlling a braking system of the vehicle. In this case, the predetermined restrictions may additionally apply to the braking system of the vehicle, e.g. by limiting an applicable braking force.

The automatic cruise control system may comprise at least one communication interface for receiving requests from the user, such as the driver, and for receiving data communicated from other units within the vehicle, such as from various sensors, systems and control units, in particular from one or more electronic control units (ECUs) controlling electrical systems or subsystems in the vehicle, such as an engine control unit and a transmission control unit. The automatic cruise control system may be configured to communicate wirelessly or via a hardwire system. The information relating to the road topography may be provided to the automatic cruise control via the communication interface and may for example be based on map data in combination with positioning information, such as global positioning system (GPS) information, and/or based on sensor data from at least one local environment perception sensor such as a camera, a radar or a lidar mounted on the vehicle. Information relating to road topography may also be downloaded from and/or uploaded to a shared data storage with which the automatic cruise control system is configured to exchange information.

The indication that the slippery road condition applies or is expected to apply may be a request from the user/driver to activate the slippery road condition driving mode. It may also be an indication received from a wheel slip sensor or similar.

Optionally, the predetermined restrictions relate to at least the allowable vehicle acceleration as the vehicle approaches and/or enters a detected uphill road section along the expected travelling route. The allowable vehicle acceleration may be set to a lower value than in non-slippery conditions, thus reducing the amount of momentum that the vehicle is allowed to gain before the uphill road section. The risk of slipping is thereby reduced.

Optionally, the predetermined restrictions are set so as to disable a positive vehicle acceleration as the vehicle approaches and/or enters the detected uphill road section.

Optionally, the predetermined restrictions are set so as to disable a positive vehicle acceleration as the vehicle approaches and/or enters the detected uphill road section unless a first predetermined condition is fulfilled. Thus, a positive acceleration may be allowed when deemed advantageous.

Optionally, the first predetermined condition is considered fulfilled if it is determined that the positive vehicle acceleration will prevent a gear shift of the powertrain. In other words, the predetermined restrictions may be set so as to enable a positive vehicle acceleration as the vehicle approaches and/or enters the detected uphill road section only if it is determined that the positive vehicle acceleration will avoid a gear shift of the powertrain.

By avoiding gear shifts during uphill travel, the risk of losing grip is minimized.

Optionally, the predetermined restrictions are set so as to restrict an allowable vehicle speed during downhill travel. Thus, the allowable vehicle speed during downhill travel will under slippery road conditions be smaller than under normal conditions. This allows the user/driver to safely operate the vehicle during downhill travel.

The predetermined restrictions may also be set so as to restrict an allowable vehicle speed prior to downhill travel. This reduces the braking need during downhill travel.

Optionally, the predetermined restrictions are set so as to disable rolling of the vehicle with a propulsion unit of the powertrain disconnected from drive wheels of the vehicle during downhill travel. Rolling is herein to be understood as freewheeling with the propulsion unit disconnected from drive wheels of the vehicle, for example by selecting a neutral gear or by disconnecting a clutch. A short disconnection of the propulsion unit in order to allow gear shifting is herein not considered as rolling and may therefore be allowed.

Optionally, the predetermined restrictions are set so as to limit the vehicle speed to a speed equal to or smaller than the set speed. This is particularly applicable during downhill travel and ensures that the driver is comfortable with the vehicle speed.

Optionally, the automatic cruise control system is configured to, as the vehicle approaches and/or enters a detected uphill road section, select a gear of the powertrain and/or set the target speed such that a gear shift during travel along the uphill road section is avoided.

According to a second aspect of the invention, at least the primary object is achieved by a method for controlling at least a powertrain of a vehicle according to the independent method claim, wherein the vehicle comprises an automatic cruise control system configured to automatically control a vehicle speed to a target speed determined based on a set speed and on information relating to a road topography along an expected travelling route of the vehicle. The method comprises:
  while automatically controlling the vehicle speed to the target speed using the automatic cruise control system, receiving an indication that a slippery road condition applies or is expected to apply,
  in response to receiving said indication, activating a predefined slippery road condition driving mode in which predetermined restrictions apply, said restrictions relating to at least one of the vehicle speed, an allowable vehicle acceleration, and a gear selection of the powertrain,
  controlling at least the powertrain in accordance with the slippery road condition driving mode.

Advantages and advantageous features of the method according to the second aspect are largely analogous to advantages and advantageous features of the automatic cruise control system according to the first aspect.

Optionally, the predetermined restrictions relate to at least the allowable vehicle acceleration as the vehicle approaches and/or enters a detected uphill road section along the expected travelling route.

Optionally, the predetermined restrictions are set so as to disable a positive vehicle acceleration as the vehicle approaches and/or enters the detected uphill road section.

Optionally, the predetermined restrictions are set so as to disable a positive vehicle acceleration as the vehicle approaches and/or enters the detected uphill road section unless a first predetermined condition is fulfilled.

Optionally, the first predetermined condition is considered fulfilled if it is determined that the positive vehicle acceleration will prevent a gear shift of the powertrain.

Optionally, the predetermined restrictions are set so as to restrict an allowable vehicle speed during downhill travel.

Optionally, the predetermined restrictions are set so as to disable rolling of the vehicle with a propulsion unit of the powertrain disconnected from drive wheels of the vehicle during downhill travel.

Optionally, the predetermined restrictions are set so as to limit the vehicle speed to a speed equal to or smaller than the set speed.

Optionally, the method further comprises:
  as the vehicle approaches and/or enters a detected uphill road section, selecting a gear of the powertrain and/or setting the target speed such that a gear shift during travel along the uphill road section is avoided.

Optionally, receiving the indication that a slippery road condition applies or is expected to apply comprises receiving a request from a driver of the vehicle, or detecting road slip, or receiving information from other vehicles.

According to a third aspect of the invention, a computer program comprising program code means for performing the steps of the method according to the second aspect when said computer program is run on a computer is provided.

According to a fourth aspect of the invention, a computer readable medium carrying a computer program comprising program code means for performing the steps of the method according to the second aspect when said computer program is run on a computer is provided.

According to a fifth aspect of the invention, a vehicle comprising the automatic cruise control system according to the first aspect of the invention is provided. Advantages and advantageous features of the vehicle according to the fifth aspect are largely analogous to advantages and advantageous features of the control device according to the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
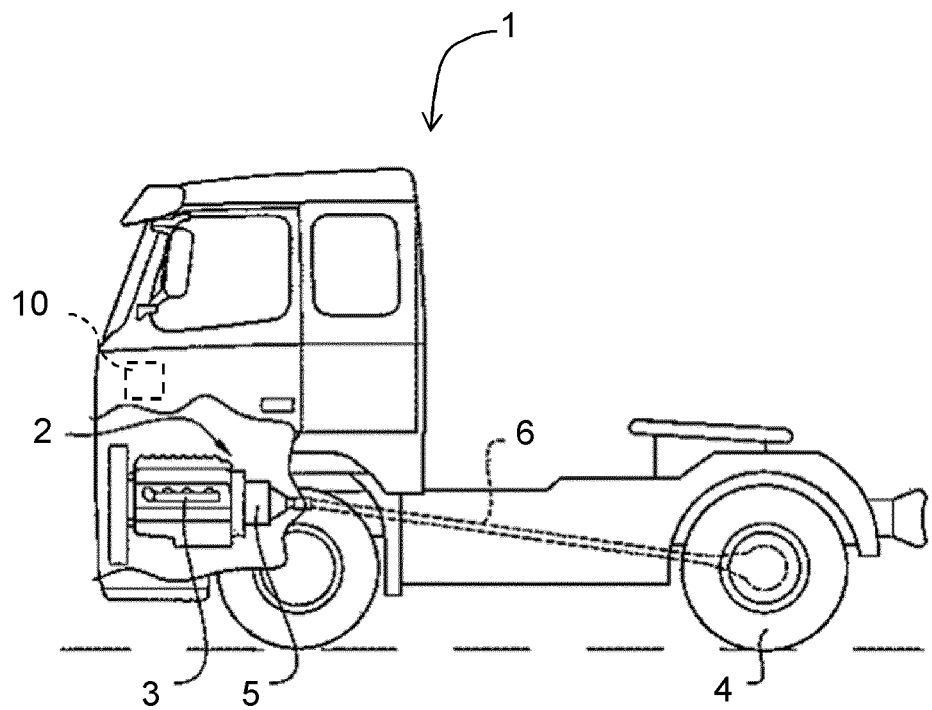
FIG. 1 shows a vehicle according to an embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 1 in the form of a heavy-duty truck is schematically shown in FIG. 1. The vehicle 1 includes an automatic cruise control system 10 for controlling a powertrain 2 of the vehicle 1. The powertrain 2 includes a propulsion unit 3, which in the shown embodiment is an internal combustion engine although other propulsion units may also or alternatively be provided, such as one or more electric machines. The propulsion unit 3 is connected to drive wheels 4 of the vehicle 1 via a transmission 5 and a driveshaft 6.

The automatic cruise control system 10 is a predictive cruise control system configured to automatically control the vehicle speed v to a target speed $v_{target}$, which target speed $V_{target}$ is set based on a set speed $v_{set}$ set by a user, usually a driver, of the vehicle 1, and based on information relating to a road topography along an expected travelling route of the vehicle 1. The automatic cruise control system 10 is equipped with a slippery road condition driving mode in which predetermined restrictions apply. The restrictions relate to at least one of the vehicle speed v, an allowable vehicle acceleration, and a gear selection of the powertrain 2. Thus, the automatic cruise control system 10 is configured to control the powertrain 2 of the vehicle 1, including setting restrictions relating to gear selection. It may also be configured to control a braking system (not shown) of the vehicle 1.

Figure 2:
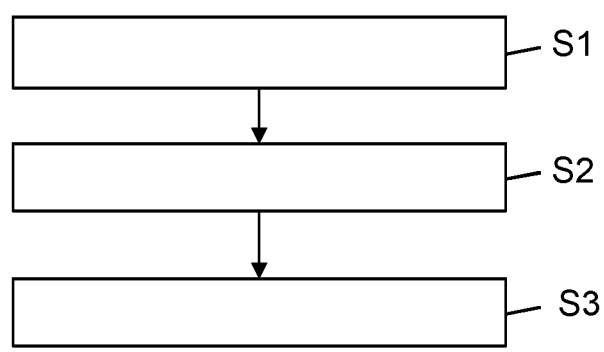
FIG. 2 is a flow chart illustrating a method according to an embodiment of the invention, FIG. 3 schematically shows a road on which a vehicle according to an embodiment of the invention is travelling.

The automatic cruise control system 10 is configured to carry out the steps of a method according to an embodiment of the invention illustrated in FIG. 2.

In a first step S1, carried out while the automatic cruise control system 10 automatically controls the vehicle speed v to the target speed $v_{target}$, an indication that a slippery road condition applies or is expected to apply is received via a communication interface of the automatic cruise control system 10. The indication may be a request from a user/driver of the vehicle 1, or a signal from a sensor configured for detecting road slip/wheel slip, or information received from another vehicle.

In a second step S2, carried out in response to receiving said indication, the predefined slippery road condition driving mode is activated.

In a third step S3, the powertrain, and optionally also the braking system of the vehicle 1, is controlled in accordance with the slippery road condition driving mode, that is, by applying the predetermined restrictions.

Figure 3:
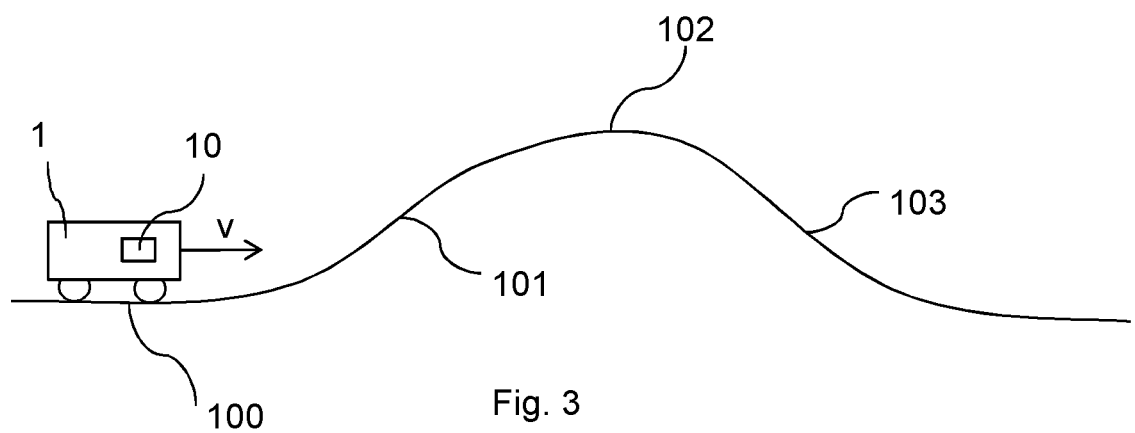

Two different exemplary driving scenarios will now be described with reference to FIG. 3, in which the vehicle 1 is travelling along a road 100 as it approaches an uphill road section 101 followed by a crest 102 and a downhill road section 103. The vehicle speed v is in both driving scenarios controlled by the automatic cruise control system 10 to a target speed $v_{target}$ as described above. For simplicity, the automatic cruise control system 10 will herein be referred to as the cruise control 10.

In a first driving scenario, a case is considered in which the slippery road condition driving mode is not activated, i.e. the predetermined restrictions do not apply. This may be considered a standard driving mode of the cruise control 10. In this scenario, as the vehicle 1 approaches the uphill road section 101, the cruise control 10 sets the target speed $v_{target}$ to a value which is higher than the set speed $v_{set}$ set by the driver such that the vehicle 1 may gain momentum and such that down-shifting when travelling along the uphill road section 101 may be prevented. The vehicle speed v is thereafter allowed to decrease below the set speed $v_{set}$ along the uphill road section 101 and when reaching the crest 102. As the downhill road section 103 starts, the cruise control 10 controls the transmission 5 to a neutral gear, such that the vehicle 1 rolls with the propulsion unit 3 disconnected from the drive wheels 4. The vehicle speed v is now allowed to increase above the set speed $v_{set}$ by a predetermined amount. As the vehicle 1 moves further down along the downhill road section 103, the powertrain 2 is controlled such that engine braking is used to brake the vehicle 1, thereby preventing the vehicle speed v from exceeding the target speed $v_{target}$. Finally, as the vehicle 1 leaves the downhill road section 103, the cruise control 10 allows the vehicle speed v to increase by rolling with the neutral gear engaged.

In a second exemplary driving scenario, a case is considered in which the slippery road condition driving mode is activated, i.e. the predetermined restrictions apply. In this scenario, as the vehicle 1 approaches the uphill road section 101, the cruise control 10 sets the target speed $V_{target}$ to a value which is equal to or lower than the set speed $v_{set}$ set by the driver such that the vehicle 1 is not allowed to gain momentum prior to the uphill road section 101. In this case, the predetermined restrictions are set so as to disable a positive vehicle acceleration as the vehicle 1 approaches and/or enters the detected uphill road section 101. Alternatively, if it is determined by the cruise control 10 that a speed increase by a certain amount prior to the uphill road section 101 may prevent an otherwise necessary down-shift, such a speed increase may be allowed. The vehicle speed v is thereafter allowed to decrease below the set speed $v_{set}$ along the uphill road section 101 and when reaching the crest 102. Optionally, when reaching the crest, the cruise control 10 may additionally reduce the vehicle speed v by applying brakes of the vehicle 1 or by engine braking. As the downhill road section 103 starts, the cruise control 10 controls the vehicle speed to a target speed $V_{target}$ which is equal to or lower than the set speed $v_{set}$. In this case, the predetermined restrictions are set so as to restrict the allowable vehicle speed during downhill travel. Alternatively, the restrictions may be set such that the target speed $V_{target}$ is smaller than a target speed $V_{target}$ used in the standard driving mode. Engine braking may be used to brake the vehicle 1 during downhill travel, thereby preventing the vehicle speed v from exceeding the target speed $V_{target}$. If necessary, the braking system of the vehicle 1, including e.g. wheel brakes, may be used. Finally, as the vehicle 1 leaves the downhill road section 103, the cruise control 10 controls the vehicle speed to a target speed $V_{target}$ which is lower than in the standard driving mode, such as equal to or lower than the set speed $v_{set}$.

Thus, according to some embodiments, the target speed $V_{target}$ may in the slippery condition driving mode be set to never exceed the set speed $v_{set}$. In other embodiments, the target speed $V_{target}$ may be allowed to exceed the set speed $v_{set}$ by a smaller amount than in the standard driving mode. For example, the vehicle speed v may be allowed to exceed the set speed $v_{set}$ by a predetermined amount during downhill travel, if such a speed increase may prevent engine braking, which may in very slippery conditions lead to wheel slip.

The control functionality of the example embodiments may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Figure 4:
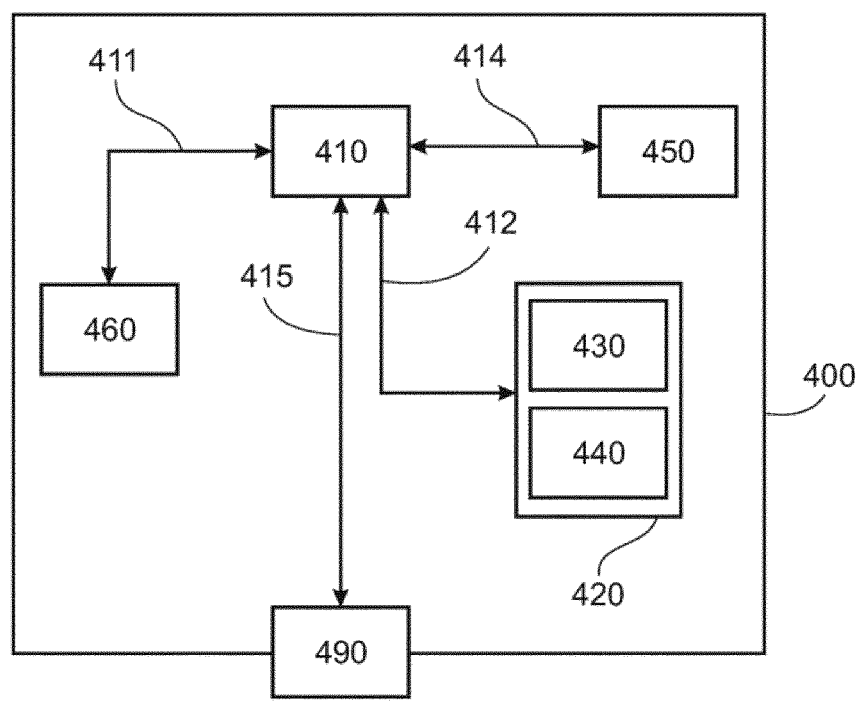
FIG. 4 shows a control device according to an embodiment of the invention.

FIG. 4 shows a control device 400 configured for carrying out the method according to embodiments of the invention, comprising a non-volatile memory 420, a data-processing unit 410 and a read and write memory 460. The memory 420 has a first memory part 430, in which a computer program for controlling the control device 400 is stored. The computer program in the memory part 430 for controlling the control device 400 can be an operating system.

The control device 400 can be comprised in the automatic cruise control system 10 described above. The data-processing unit 410 can comprise, for example, a microcomputer. The memory 420 also has a second memory part 440, in which a program for controlling at least the powertrain according to the invention is stored. In an alternative embodiment, the program for controlling at least the powertrain is stored in a separate non-volatile storage medium 450 for data, such as, for example, a CD or an exchangeable semiconductor memory. The program can be stored in an executable form or in a compressed state. When it is stated below that the data-processing unit 410 runs a specific function, it should be clear that the data-processing unit 410 is running a specific part of the program stored in the memory 420 or a specific part of the program stored in the non-volatile storage medium 450. The data-processing unit 410 is tailored for communication with the non-volatile storage medium 450 through a data bus 414. The data-processing unit 410 is also tailored for communication with the memory 420 through a data bus 412. In addition, the data-processing unit 410 is tailored for communication with the memory 460 through a data bus 411. The data-processing unit 410 is also tailored for communication with a data port 490 by the use of a data bus 415.

It is to be understood that the present invention is not limited to the embodiments described above and illustrated in the drawings; rather, the skilled person will recognize that many changes and modifications may be made within the scope of the appended claims.

The invention claimed is:

1. An automatic cruise control system for controlling at least a powertrain of a vehicle, the cruise control system being configured to automatically control a vehicle speed to a target speed determined based on a set speed and on information relating to a road topography along an expected travelling route of the vehicle, the automatic cruise control system configured to:

while automatically controlling the vehicle speed to the target speed, receive an indication that a slippery road condition applies or is expected to apply, in response to receiving said indication, activate a predefined slippery road condition driving mode in which predetermined restriction apply, the predetermined restrictions set so as to disable a positive vehicle acceleration as the vehicle approaches and/or enters a detected uphill road section along the expected travelling route unless a first predetermined condition is fulfilled, the first predetermined condition considered fulfilled if it is determined that the positive vehicle acceleration will prevent a gear shift of the powertrain, and control at least the powertrain in accordance with the slippery road condition driving mode.

2. The automatic cruise control system according to claim 1, wherein the predetermined restrictions are set so as to disable a positive vehicle acceleration as the vehicle approaches and/or enters the detected uphill road section.

3. The automatic cruise control system according to claim 1, wherein the predetermined restrictions are further set so as to restrict an allowable vehicle speed during downhill travel.

4. The automatic cruise control system according to claim 1, wherein the predetermined restrictions are further set so as to disable rolling of the vehicle with a propulsion unit of the powertrain disconnected from drive wheels of the vehicle during downhill travel.

5. The automatic cruise control system according to claim 1, wherein the predetermined restrictions are further set so as to limit the vehicle speed to a speed equal to or smaller than the set speed.

6. The automatic cruise control system according to claim 1, wherein the automatic cruise control system is configured to, as the vehicle approaches and/or enters a detected uphill road section, select a gear of the powertrain and/or set the target speed such that a gear shift during travel along the uphill road section is avoided.

7. The method according to claim 1, further comprising:
as the vehicle approaches and/or enters a detected uphill road section, selecting a gear of the powertrain and/or setting the target speed such that a gear shift during travel along the uphill road section is avoided.

8. A vehicle comprising the automatic cruise control system according to claim 1.

9. A method for controlling at least a powertrain of a vehicle, the vehicle comprising an automatic cruise control system configured to automatically control a vehicle speed to a target speed determined based on a set speed and on information relating to a road topography along an expected travelling route of the vehicle, the method comprising:
while automatically controlling the vehicle speed to the target speed using the automatic cruise control system, receiving an indication that a slippery road condition applies or is expected to apply,
in response to receiving said indication, activating a predefined slippery road condition driving mode in which predetermined restrictions apply, the predetermined restrictions set so as to disable a positive vehicle acceleration as the vehicle approaches and/or enters a detected uphill road section along the expected travelling route unless a first predetermined condition is fulfilled, the first predetermined condition considered fulfilled if it is determined that the positive vehicle acceleration will prevent a gear shift of the powertrain,
controlling at least the powertrain in accordance with the slippery road condition driving mode.

10. The method according to claim 9, wherein the predetermined restrictions are set so as to disable a positive vehicle acceleration as the vehicle approaches and/or enters the detected uphill road section.

11. The method according to claim 9, wherein the predetermined restrictions are further set so as to restrict an allowable vehicle speed during downhill travel.

12. The method according to claim 9, wherein the predetermined restrictions are further set so as to disable rolling of the vehicle with a propulsion unit of the powertrain disconnected from drive wheels of the vehicle during downhill travel.

13. The method according to claim 9, wherein the predetermined restrictions are further set so as to limit the vehicle speed to a speed equal to or smaller than the set speed.

14. The method according to claim 9, wherein receiving the indication that a slippery road condition applies or is expected to apply comprises receiving a request from a driver of the vehicle, or detecting road slip, or receiving information from other vehicles.

15. A non-transitory computer readable medium carrying a computer program comprising program code for performing the steps of claim 9 when said computer program is run on a computer.

* * * * *